(12) United States Patent
Kubota et al.

(10) Patent No.: US 6,561,651 B1
(45) Date of Patent: May 13, 2003

(54) MULTIPLE DISPLAY APPARATUS

(75) Inventors: Akihiro Kubota, Tokyo (JP); Yasuhiro Komiya, Tokyo (JP); Susumu Kobayashi, Saitama (JP); Fujio Kosaka, Tokyo (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/718,214

(22) Filed: Nov. 21, 2000

(30) Foreign Application Priority Data

Nov. 22, 1999 (JP) ............................................. 11-331627
Mar. 15, 2000 (JP) ........................................ 2000-072857

(51) Int. Cl.⁷ ........................... G03B 21/14; G03B 21/28
(52) U.S. Cl. ............................... 353/30; 353/37; 353/94
(58) Field of Search .............................. 353/37, 34, 30, 353/94, 99; 352/133, 71, 70; 348/744, 383

(56) References Cited

U.S. PATENT DOCUMENTS

| | | | | |
|---|---|---|---|---|
| 3,526,452 A | * | 9/1970 | Dorn | 352/70 |
| 5,305,029 A | * | 4/1994 | Yoshida et al. | 353/37 |
| 5,883,681 A | * | 3/1999 | Kono et al. | 353/37 X |
| 5,902,030 A | * | 5/1999 | Blanchard | 353/30 |
| 6,017,123 A | * | 1/2000 | Bleha et al. | 353/30 |
| 6,042,238 A | * | 3/2000 | Blackham et al. | 353/94 |

FOREIGN PATENT DOCUMENTS

JP    9-326981    12/1997    ............ H04N/5/74

* cited by examiner

Primary Examiner—W. B. Perkey
(74) Attorney, Agent, or Firm—Ostrolenk, Faber, Gerb & Soffen, LLP

(57) ABSTRACT

A multiple display apparatus for displaying an image with projection of a plurality of images from a plurality of image projecting means 10p, 10q onto a screen is disclosed. The plurality of image projecting means 10p, 10q are disposed such that their images are projected substantially from one point onto the screen 20. Thus it is possible to realize superior display quality without pronounced display in any overlap part.

9 Claims, 11 Drawing Sheets

MULTIPLE DISPLAY APPARATUS

BACKGROUND OF THE INVENTION

This application claims benefit of Japanese Patent Application No. 11-331627 and 2000-72857 filed on Nov. 22, 1999 and Mar. 15, 2000, respectively, the contents of which are incorporated by the reference.

The present invention relates to a multiple display apparatus for displaying a single image on a screen by projecting a plurality of images thereonto and, more particularly, to a seamless multiple display apparatus, in which adjacent areas of a plurality of images projected onto a screen are overlapped.

FIG. 13 is a schematic view showing a general construction example of a rear projection type seamless multiple display apparatus.

The illustrated seamless multiple display apparatus in FIG. 13 has a plurality of (i.e., total number of 9=3×3, 3 in horizontal (or X) direction and 3 in vertical (or Y) direction) liquid crystal projectors 10a to 10i disposed on the rear side of the screen 20. A single image is formed by images projected from the projectors 10a to 10i onto corresponding areas 20a to 20i on the screen 20.

In this seamless multiple display screen, an overlap part 21 is formed in adjacent parts of the images projected from the projectors 10a to 10i onto the screen 20. A problem is thus posed in that the display in the overlap part 21 is brighter than in the other areas because of the incidence of the light fluxes from two to four projectors. Another problem that may be encountered is a failure of projection of accurate image on the screen 20 due to such distortion as percussions without accurate position relationship among the projectors 10a to 10i.

To prevent the above problems, Japanese Patent Laid-Open No. 9-326981 proposes a method, in which an image is previously projected onto a screen by using a test signal and photographed with a digital camera, photograph data thus obtained is then corrected, and geometrical conversion, color correction and luminance correction of an input signal are performed by using the corrected data.

The photographing by the digital camera is usually performed from the front of the screen. Therefore, a problem is posed that, watching the projected image in a direction deviated from the screen front (for instance in an oblique direction of an upward or downward direction), results in brightness difference in,the overlap part from the other areas of the screen due to different directions of projection of the projectors and visual field angle characteristic of the screen, so that the display in the overlap part is pronounced. More specifically, as shown in FIG. 14, when observing image projected from the projectors 10u and 10v onto the screen, the light doses at points A and B are equal in the case of observation in front-ward direction D1, but observation in oblique direction D2 results in that the point A is darker due to less light dose thereat than at the point B.

As shown, the prior art seamless multiple display apparatus has a problem that the display in an overlap part of adjacent images is pronounced.

SUMMARY OF THE INVENTION

The present invention was made in view of the above problems, and it has an object of providing a multiple display apparatus featuring superior display quality without pronounced display in any overlap part.

According to an aspect of the present invention, there is provided a multiple display apparatus for displaying an image with projection of a plurality of images from a plurality of image projecting means onto a screen, wherein: the plurality of image projecting means are disposed such that their images are projected substantially from one point onto the screen.

According to another aspect of the present invention, there is provided a multiple display apparatus for displaying an image with projection of a plurality of images from a plurality of image projecting means onto a screen, and the plurality of image projecting means are disposed such that their images are projected substantially from one point onto the screen and adjacent areas of images projected from the plurality of image projecting means onto the screen overlap one another.

According to other aspect of the present invention, there is provided a multiple display apparatus for displaying an image with projection of a plurality of images from a plurality of image projecting means onto a screen, wherein: the plurality of image projecting means are disposed such that their images are projected substantially from one point onto the screen and the image projecting means include image emitting means for emitting light fluxes of images to be projected onto the screen and reflecting means for reflecting the projection light fluxes emitted from the image emitting means toward the screen.

According to still other aspect of the present invention, there is provided a multiple display apparatus for displaying an image with projection of a plurality of images from a plurality of image projecting means onto a screen, and the plurality of image projecting means are disposed such that their images are projected substantially from one point onto the screen, adjacent areas of images projected from the plurality of image projecting means onto the screen overlap one another and the image projecting means include image emitting means for emitting light fluxes of images to be projected onto the screen and reflecting means for reflecting the projection light fluxes emitted from the image emitting means toward the screen.

Those of the plurality of image projecting means for projecting images onto the screen in the same row in horizontal direction are disposed horizontally, whereby images of light fluxes emitted from horizontally arranged predetermined image emitting means are projected via the reflecting means onto the screen in a predetermined area of the same row in horizontal direction; and those of the plurality of image projecting means for projecting images onto the screen in the same column in vertical direction are disposed vertically, whereby images of light fluxes emitted from vertically arranged predetermined image emitting means are projected via the reflecting means onto the screen in a predetermined area of the same column in vertical direction.

Those of the plurality of image projecting means for projecting images onto the screen in the same row in horizontal direction are disposed vertically, whereby images of light fluxes emitted from vertically arranged predetermined image emitting means are projected via the reflecting means onto the screen in a predetermined area of the same row in horizontal direction; and those of the plurality of image projecting means for projecting images onto the screen in the same column in vertical direction are disposed-vertically, whereby images of light fluxes emitted from vertically arranged predetermined image emitting means are projected via the reflecting means onto the screen in a predetermined area of the same column in vertical direction.

An area of the reflecting means of an image projecting means, on which the light flux projected from an adjacent image projecting means onto the screen is partly incident, is constructed such as to transmit part of the incident light.

According to further aspect of the present invention, there is provided a multiple display apparatus for displaying an image with projection of a plurality of images from a plurality of image projecting means onto a screen, wherein: the plurality of image projecting means are disposed such that their images are projected substantially from one point onto the screen, the plurality of image projecting means each include an image generating means for generating an image to be projected onto the screen, and a lens provided between the image generating means and the screen and those of the plurality of image projecting means, which do not regularly face the screen, are constructed such that the image surfaces of their image generating means are tiltable in vertical direction with respect to the lens axis.

According to still further aspect of the present invention, there is provided a multiple display apparatus for displaying an image with projection of a plurality of images from a plurality of image projecting means onto a screen, and the plurality of image projecting means are disposed such that their images are projected substantially from one point onto the screen and adjacent areas of images projected from the plurality of image projecting means onto the screen overlap one another, wherein: the plurality of image projecting means each include an image generating means for generating an image to be projected onto the screen, and a lens provided between the image generating means and the screen, and those of the plurality of image projecting means, which do not regularly face the screen, are constructed such that the image surfaces of their image generating means are tiltable in vertical direction with respect to the lens axis.

In the focus adjustment of the images projected from the image projecting means onto the screen by adjusting the tilting angles of the image surfaces, no image is projected from the image projecting means adjacent to the image projecting means under adjustment onto the screen.

The multiple display apparatus further comprises: detecting means for detecting a spatial frequency from an image obtained by photographing the image projected onto the screen; a computing means for obtaining the tilting angle of the image surface of the image generating means on the basis of the detection result by the detecting means; and a tilting control means for causing tilting of the image surface of the image generating means on the basis of the tilting angle obtained by in the computing means.

According to other aspect of the present invention, there is provided a multiple display apparatus for displaying an image with projection of images from a plurality of image projecting means onto a screen, wherein: a light dose limiting means for limiting the light dose in an overlap area of the images projected from the plurality of image projecting means onto the screen, is provided between the image projecting means and the screen.

The light dose limiting means has areas, in which transmitted light dose increases gradually from a point to another.

Other objects and features will be clarified from the following description with reference to attached drawings.

PREFERRED EMBODIMENTS OF THE INVENTION

Preferred embodiments of the present invention will now be described with reference to the drawings.

Now, a first embodiment of the present invention will be described with reference to drawings.

Figure 1:
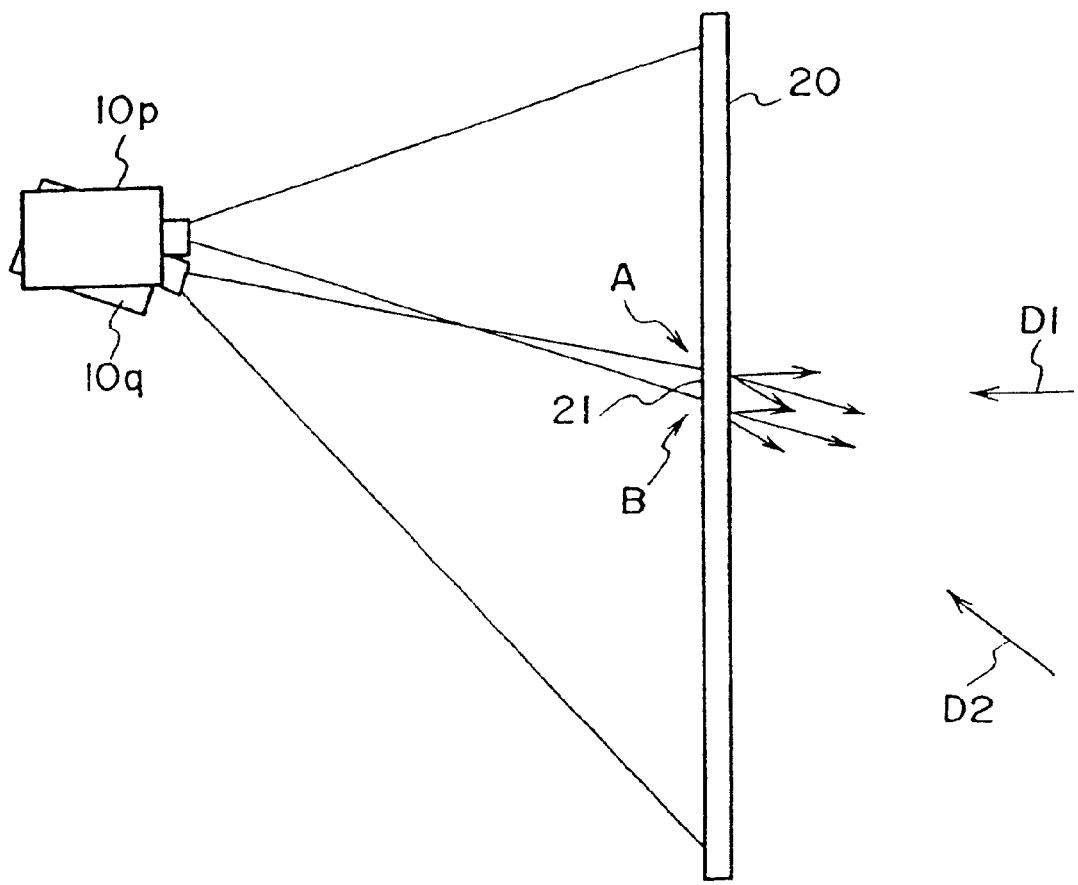
FIG. 1 is a schematic view showing the basic construction of the first embodiment of multiple display apparatus according to the present invention.

FIG. 1 is a schematic view showing the basic construction of the first embodiment of seamless multiple display apparatus. The apparatus comprises a plurality of image projecting means (although liquid crystal projectors 10$p$ and 10$q$ being shown as image projecting means, the apparatus actually comprises m×n image projecting means) disposed such that image is projected substantially from one point onto a screen 20.

With this arrangement of the plurality of image projecting means it is possible to have the projecting directions (or directivities) of the light fluxes to be substantially the same in overlap part 21 of adjacent images. It is thus possible to obtain a multiple display apparatus capable of reducing the brightness difference in the overlap part 21 (i.e., making the light dose at point A and B in FIG. 21 to be equal) and ensuring excellent display quality free from pronounced display in the overlap part. Also, since image is projected substantially from one point onto the screen, it is possible to construct conforming Fresnel lens or renticular and increase the screen luminance.

Figure 2A:
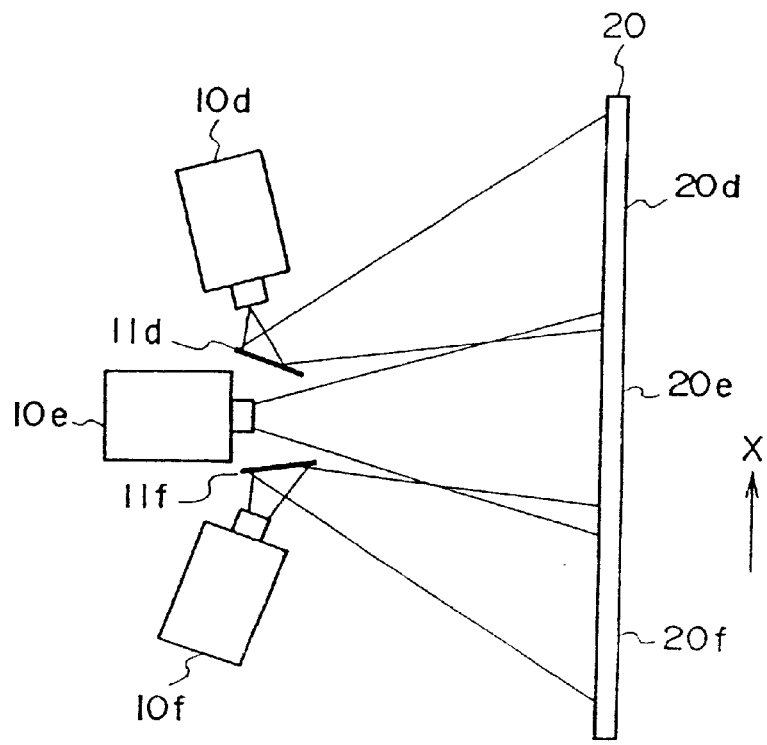
FIGS. 2A and 2B are schematic views showing a first construction example of the first embodiment.
Figure 2B:
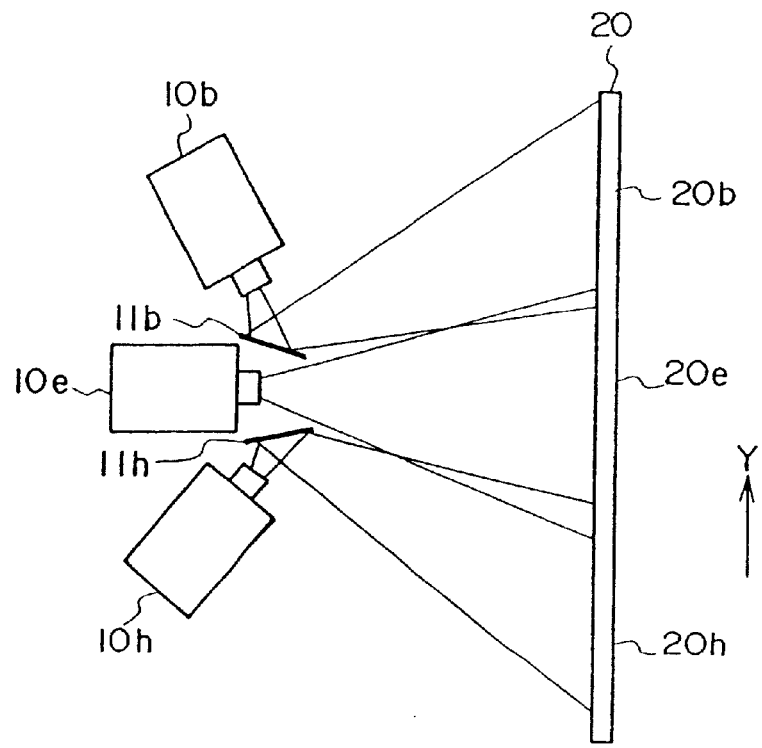
Figure 13:
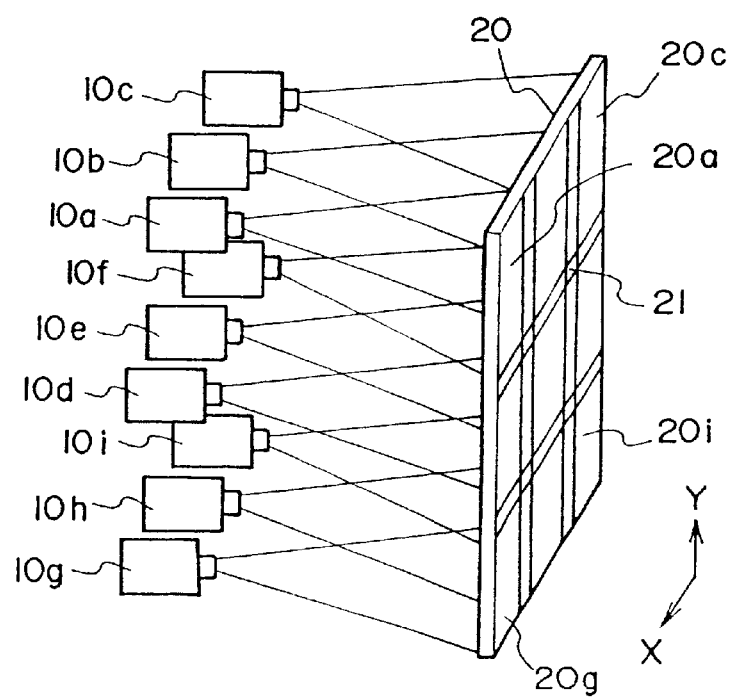
FIG. 13 is a schematic view showing a general construction example of a multiple display apparatus.
Figure 14:
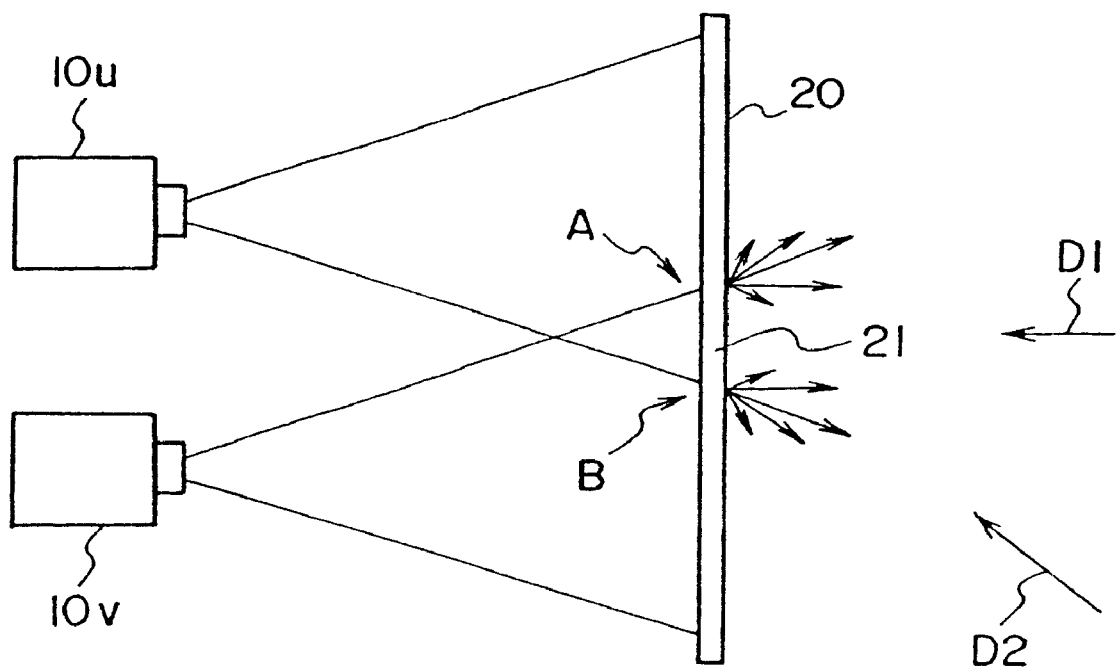
FIG. 14 is a view for describing the problem of prior art multiple display apparatus.

FIGS. 2A and 2B are schematic views showing a first construction example of the embodiment. Like the case of FIG. 13, it is assumed that the number of the image projecting means provided is 3×3=9. (This number is assumed in other examples as well unless otherwise specified.) In FIGS. 2A and 2B, the reference numerals correspond to those in FIG. 13.

FIG. 2A schematically shows an example of arrangement of image projecting means (i.e., projectors 10$d$, 10$e$ and 10$f$ and reflectors 11*d* and 11*f*) for displaying images on the screen in the same row in the horizontal (i.e., X) direction. In the illustrated example, image projecting means for displaying images of the central row are shown. Specifically, in this example the opposite side, i.e., left and right, projectors 10*d* and 10*f*, are tilted toward the projector 10*e*, and light fluxes emitted from the projectors 10*d* and 10*f* are reflected by reflectors 11*d* and 11*f* such that the projected light fluxes from the individual image projecting means are generated substantially from one point.

FIG. 2B schematically shows an example of arrangement of image projecting means (i.e., projectors 10*b*, 10*e* and 10*h* and reflectors 11*b* and 11*h*) for, displaying images on the screen in the same column in the vertical (i.e., Y) direction. In the illustrated example, image projecting means for displaying images of the central column are shown. Specifically, the upper and lower projectors 10*b* and 10*h* are tilted toward the projector 10*e*, and light fluxes emitted from the projectors 10*b* and 10*h* are reflected by reflectors 11*b* and 11*h* such that the projected light fluxes from the individual image projecting means are substantially generated from one point.

The projectors 10*a* and 10*c*, like the projector 10*b*, are tilted toward the projector 10*e*, and the projectors 10*g* and 10*i*, like the projector 10*h*, are tilted toward the projector 10*e*. That is, as for the projectors 10*a*, 10*c*, 10*g* and 10*i*, two reflectors are used for reflection in the horizontal and vertical directions.

In view of the attenuation of light doses by the reflectors, for image projecting means with less number of times of reflecting by reflector the light dose may be corrected by using such means as ND filter for correcting the brightness deviations among the individual image projecting means.

As shown above, in this example nine image projecting means are arranged with the reflectors such that the images from them are projected substantially from one point onto the screen. It is thus possible to let the light be projected substantially in the same direction in the overlap part of adjacent images, and it is thus possible to eliminate outstanding display in the overlap part.

Figure 3A:
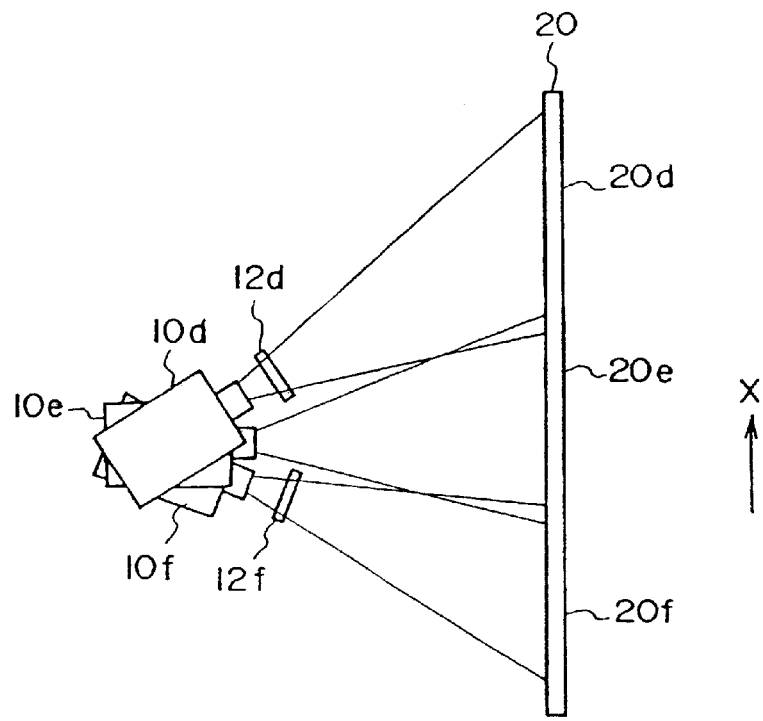
FIGS. 3A to 3C are schematic views showing a second construction example of the first embodiment.
Figure 3B:
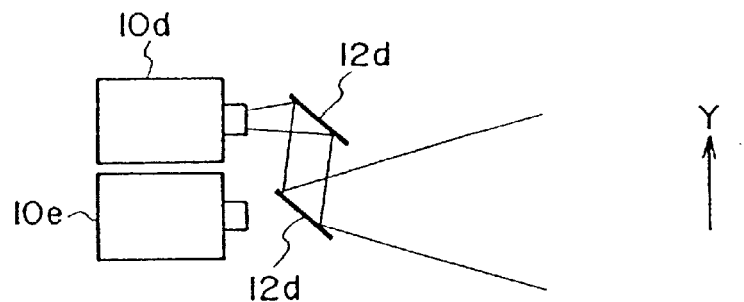
Figure 3C:
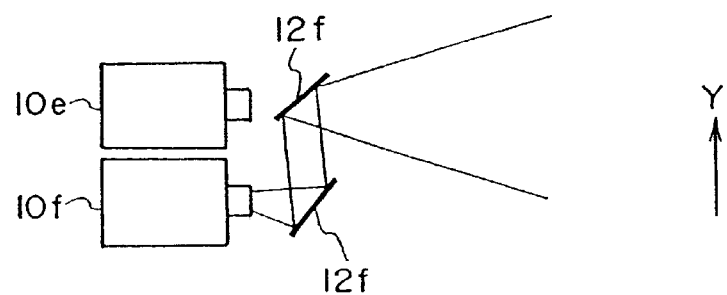

FIGS. 3A to 3C are schematic views showing a second construction example of the embodiment.

FIG. 3A schematically shows image projecting means (i.e., projectors 10*d*, 10*e* and 10*f* and reflector 12*d* and 12*f*) for displaying images on the screen in the same row in the horizontal (i.e. X) direction. In the illustrated example, image projecting means for displaying images of the central row are shown. FIG. 3B is a schematic side view of the arrangement of the projectors 10*d* and 10*e* and reflector 12*d* shown in FIG. 3A, and FIG. 3C is a schematic side view showing the arrangement of the projectors 10*e* and 10*f* and reflector 12*f* shown in FIG. 3A. Actually, the projectors 10*d*, 10*e* and 10*f* are disposed such that they overlap each other.

In the previous first construction example, a certain reflector in the image projecting means partly overlap part of the projection area of the other image projecting means. In addition, since the projectors have a certain size, a case may arise, in which it is difficult to have the projected light fluxes from the individual image projecting means to be generated from one point.

Accordingly, in this example the projectors 10*d* and 10*f* for displaying the left and right images are disposed one below the other (i.e., in the vertical direction) with respect to the projector 10*a* for displaying the central image, and the light fluxes emitted from the projectors 10*d* and 10*f* are reflected by the reflectors 12*d* and 12*f* (each of a dual structure). In this way, the projected light fluxes reflected by the reflectors 12*d* and 12*f* are generated substantially from the same horizontal plane as the emitted light flux from the projector 10*e*.

In the set of projectors 10*a*, 10*b* and 10*c* and the set of projectors 10*g*, 10*h* and 10*i*, like the set of projectors 10*d*, 10*e* and 10*f*, the individual projectors are disposed such that they overlap one above another and, as in the case of FIG. 2B, tilted in the vertical direction.

In this example, since the plurality of projectors for displaying images on the screen in the same row in the horizontal direction are disposed one above another, it is possible to have the projected light flux from the individual image projecting means substantially ideally generated from one point.

Figure 4:
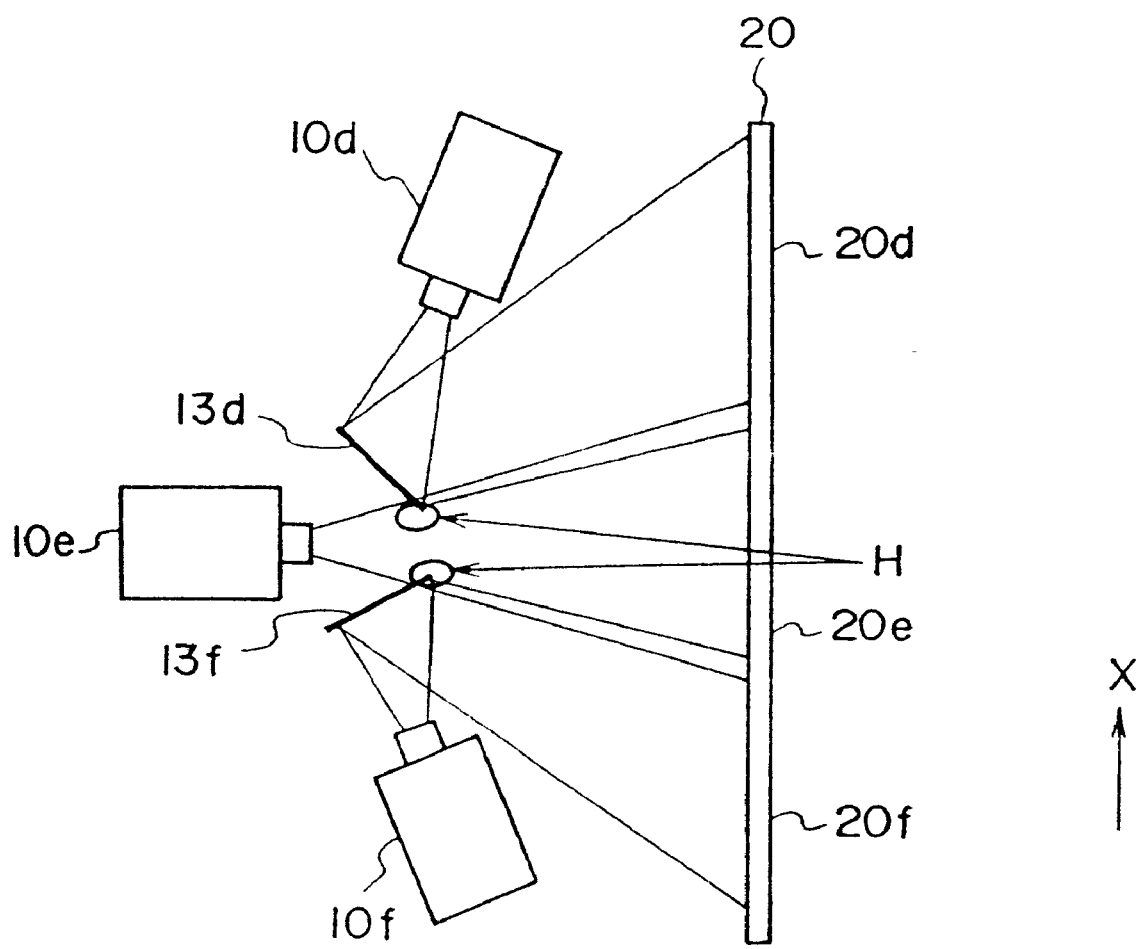
FIG. 4 is a schematic view showing a third construction example of the first embodiment.

FIG. 4 is a schematic view showing a third construction example of the embodiment.

As described before, in the first construction example, the part of the reflector of a certain image projecting means may produce fog on part of the reflector of a different image projecting means. In addition, since the individual projectors have a certain size, it is difficult to have the projected light fluxes from the individual image projecting means generated from one point.

In this example, in an area of the reflector of a certain image projecting means, in which the light flux from an adjacent image projecting means is incident, the reflector is accordingly constructed such that it partly transmits light. Specifically, as shown in FIG. 4, a partial area H of each of the reflectors 13*d* and 13*f* constituting the left and right ones of the image projecting means for displaying images on the screen 20 in one row in the horizontal direction, is a half mirror. More specifically, part of the light flux emitted from the central projector 10*a*, that is incident on the area H, is transmitted through the reflectors 13*d* and 13*f*, while part of the light fluxes emitted from the left and right projectors 10*d* and 10*f*, that is incident on the area H, is reflected by the reflectors 13*d* and 13*f*. Thus, in the area H projected light fluxes are attenuated in a predetermined ratio (for instance ½) are combined, and the resultant combined or projected light flux is projected onto the screen.

In lieu of making the area H to be an optical half mirror, the structure of the area H may be made such that it has a plurality of small holes, and a reflecting surface on the side of the left and right projectors 10*d* and 10*f* and a shielded surface on the side of the central projector 10*a*. In this case, the reflectors 13*d* and 13*f* are preferably made to be somewhat thick so that the projected light is attenuated to a certain extent while passing through the holes.

While the above example is shown in connection with the horizontal direction, it is possible to adopt like structure in connection with the vertical direction.

In this example, since a partial area of each reflector has a half mirror or like structure, it is possible to have the projected light fluxes from the individual image projecting means substantially ideally generated from one point.

In the case of image projection onto a flat screen by using a multiple display apparatuses concerning each of the above construction examples, the image projecting means involving the upwardly and downwardly or left-wardly and right-wardly tilted projected light flux directions leads to differences of the distances of projection to the screen. To cope with such projection differences, it is conceivable to provide such means as limiting the projection distance differences to be within the projector's object field depth or provide an arched screen having an arched projecting surface.

However, it is also possible to use the following means (i.e., fourth construction example given hereinunder).

Figure 5:
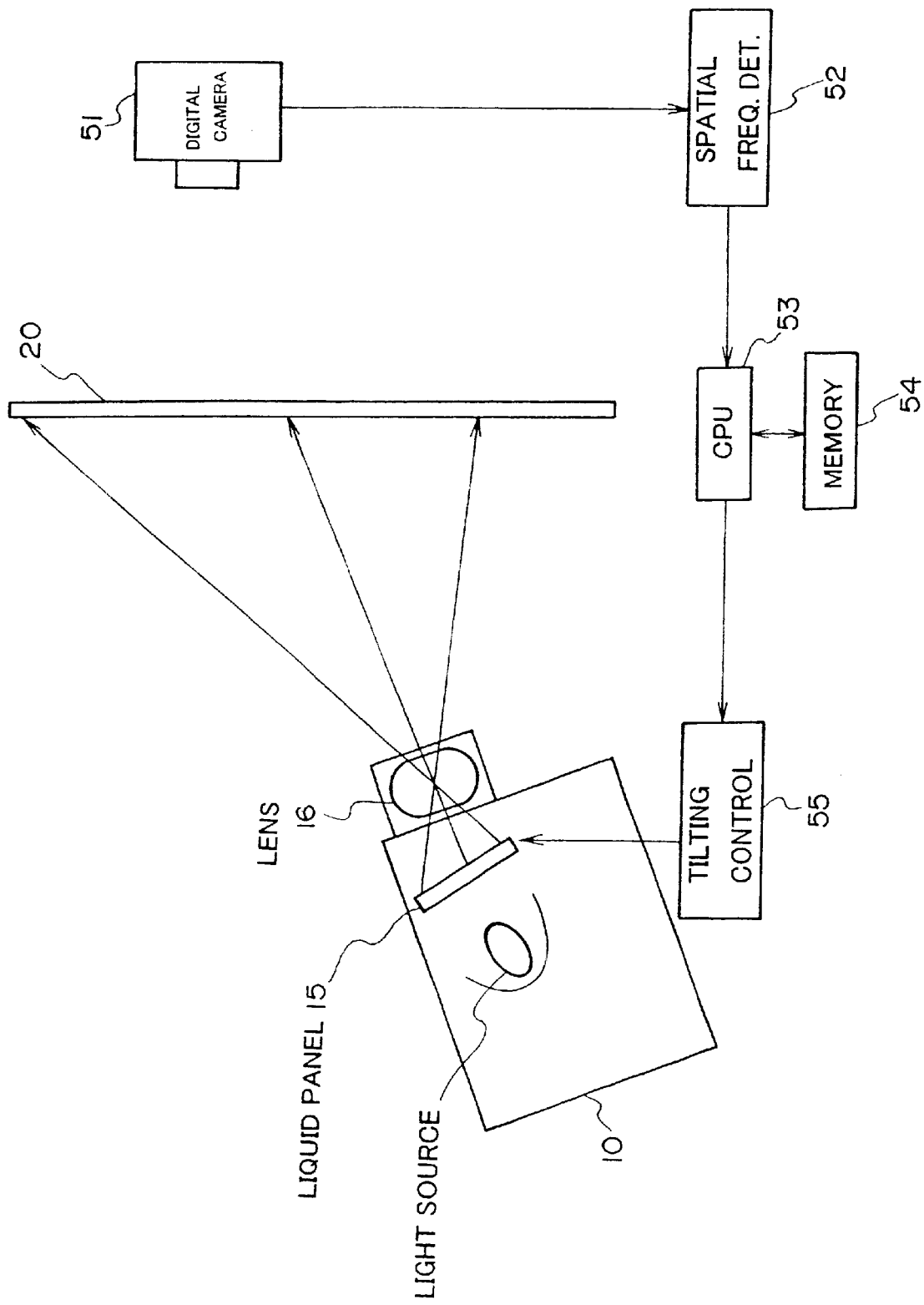
FIG. 5 is a schematic view showing the fourth construction example of the first embodiment.
Figure 6:
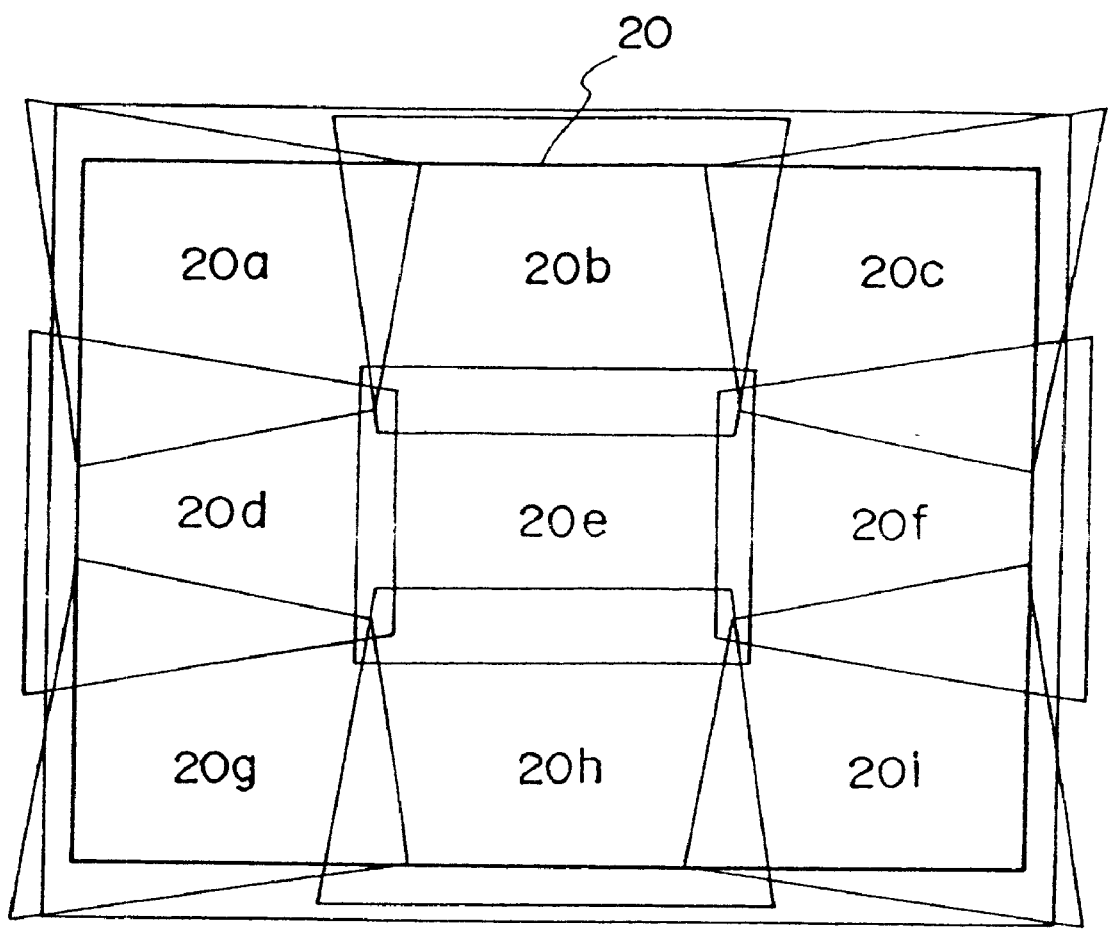
FIG. 6 is a view showing the scopes of projection of images from projectors onto screen in the fourth construction example.

FIG. 5 is a schematic view showing the fourth construction example of the embodiment. FIG. 6 is a view showing the scopes of projection of images from projectors onto screen.

Among the plurality of projectors, any other one than the projector for displaying image on the central screen area, i.e., a projector 10 not regularly facing the screen 20, as shown in FIG. 5, a difference of the distance of projection to the screen 20 is produced. Therefore, out-of-focus images are displayed on the screen 20 in portions thereof out of the object field depth.

In this example, the image generating means (i.e., liquid crystal panel 15) of the projector 10is vertically tiltable by a desired angle from the axis of lens 16. By tilting the liquid crystal panel 15 (i.e., image surface thereof) it is possible to obtain in-focus image display in areas other than the central area 20e of the screen 20 as well. (In this case, however, trapezoidal distortion is generated in the other areas than the central area 20e).

For focus adjustment by adjusting the tilting of the liquid crystal panel 15, the adjustment may be performed automatically with the system as shown in FIG. 5, although it is possible that the user adjusts the tilting by watching the image projected onto the screen 20. The automatic tilting adjustment will now be described.

An image containing harmonic components of dots, resolution analysis chart, etc., is projected from the projector 10 onto the screen 20, and the projected image is photographed by a digital camera 51. A spatial frequency detecting means 52 measures frequency components of the projected image. According to the result of measurement, a calculating means constituted by a CPU 53 and a memory 54 calculates the tilting angle of the liquid crystal panel 15. The calculated tilting angle data is fed out to a tilting control means 55 including a motor. Receiving the tilting angle data, the tilting control means 55 causes tilting of the liquid crystal panel 15.

As shown, the above system performs an operation like so-called "mountain climbing AF" which is usually employed in cameras. The above sequence of operations is performed a certain number of times by feed-back so as to tilt the liquid crystal panel 15 to obtain a display containing maximum harmonic components.

In the adjustment of the tilting angle of the liquid crystal panel 15, simultaneous projection of the overlap part of adjacent images may lead to difficulty of judging which projector is in out-of-focus state. Accordingly, the individual projectors may be adopted to be adjusted sequentially instead of simultaneously adjusting projectors for projecting images onto adjacent areas.

As shown, in this example it is possible to reliably focus the entire images projected onto the screen by tilting the image surfaces of the liquid crystal panels.

In the first embodiment as described above, trapezoidal distortion is generated in the projection of image from image projecting means involving upwardly and downwardly or left-wardly and right-wardly tilted projected light flux directions. Such trapezoidal distortion can be corrected by a method disclosed in, for instance, Japanese Patent Laid-Open No. 9-326981. This correction method will now be described with reference to FIG. 7.

Figure 7:
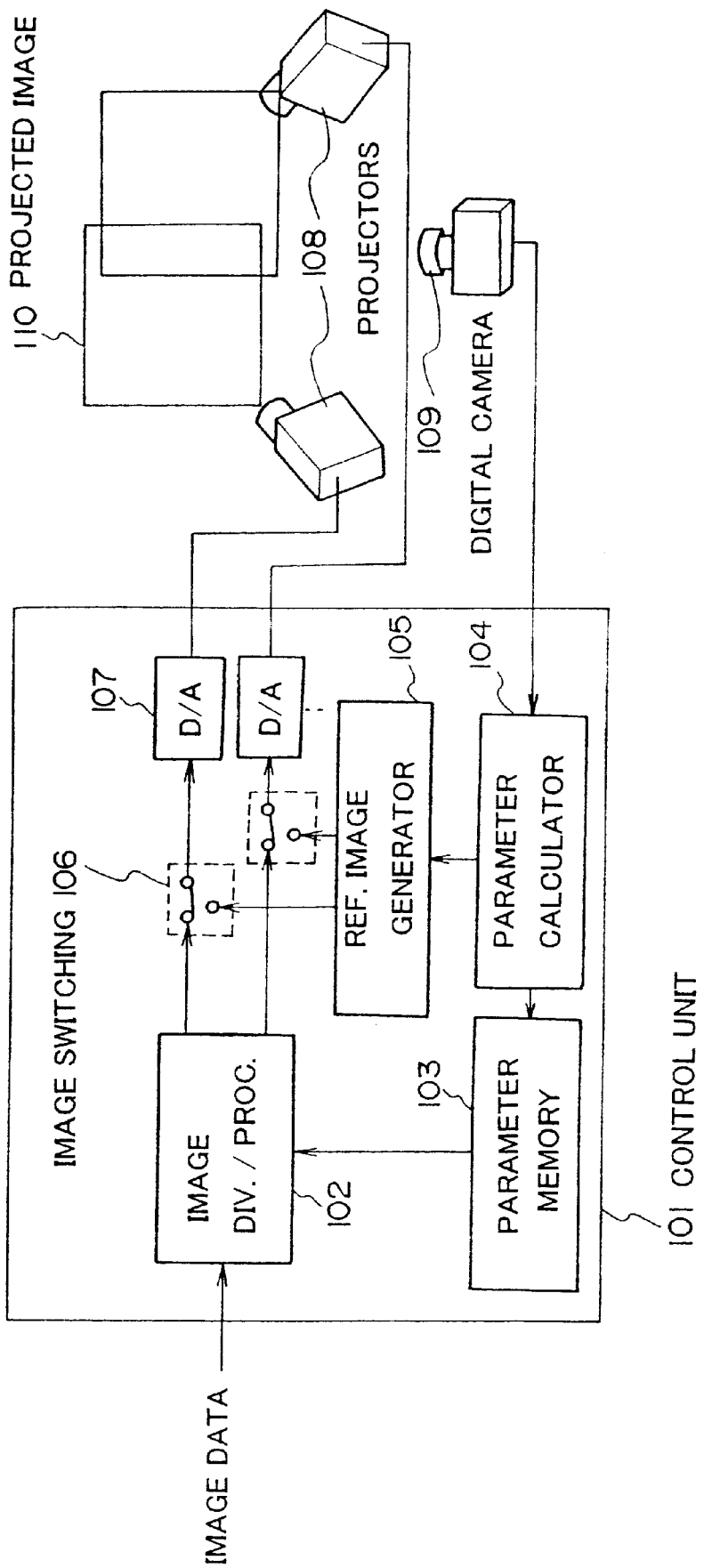
FIG. 7 is a drawing showing the correction means for correcting the trapezoidal distortion caused by the image projection onto the flat screen in the first embodiment according to the present invention.

The system shown in FIG. 7 largely comprises a controller unit 101, a projector 108 and a digital camera 109. The digital camera 109 is actually disposed near the position of an image-watching person, so that it can photograph projected image on the screen.

At image setting time, an image switching means 106 is switched to project a reference image generated in a reference image generator 105 onto the screen. The digital camera 109 photographs the projected reference image, and feeds out the obtained image data to a parameter calculator 104. The parameter calculator 104 calculates a parameter for determining the disposition of projectors. The calculated parameter is stored in a parameter memory 103, and read out, when desired, to be fed to an image divider/processor 102. The image divider/processor 102 corrects the input image data by using the read-out parameter, and feed out corrected data thus obtained via a D/A converter 107 to the projectors 108.

It is thus possible to correct the trapezoidal distortion on the screen with such means.

A second embodiment of the present invention will now be described with reference to drawings.

As described before, in the seamless multiple display apparatus an overlap part is generated in adjacent images projected from the individual projectors onto the screen. A problem is thus posed in that the overlap part becomes brighter than the other areas because of the incidence of light fluxes from two to four projectors on the overlap part. For example, even when a black image is projected, the overlap part becomes brighter than the other parts because the liquid crystal projectors transmit even very slight light. Making electric brightness correction such that the other parts than the overlap part are substantially at the same brightness level as in the overlap part, results in dynamic range reduction.

Figure 8:
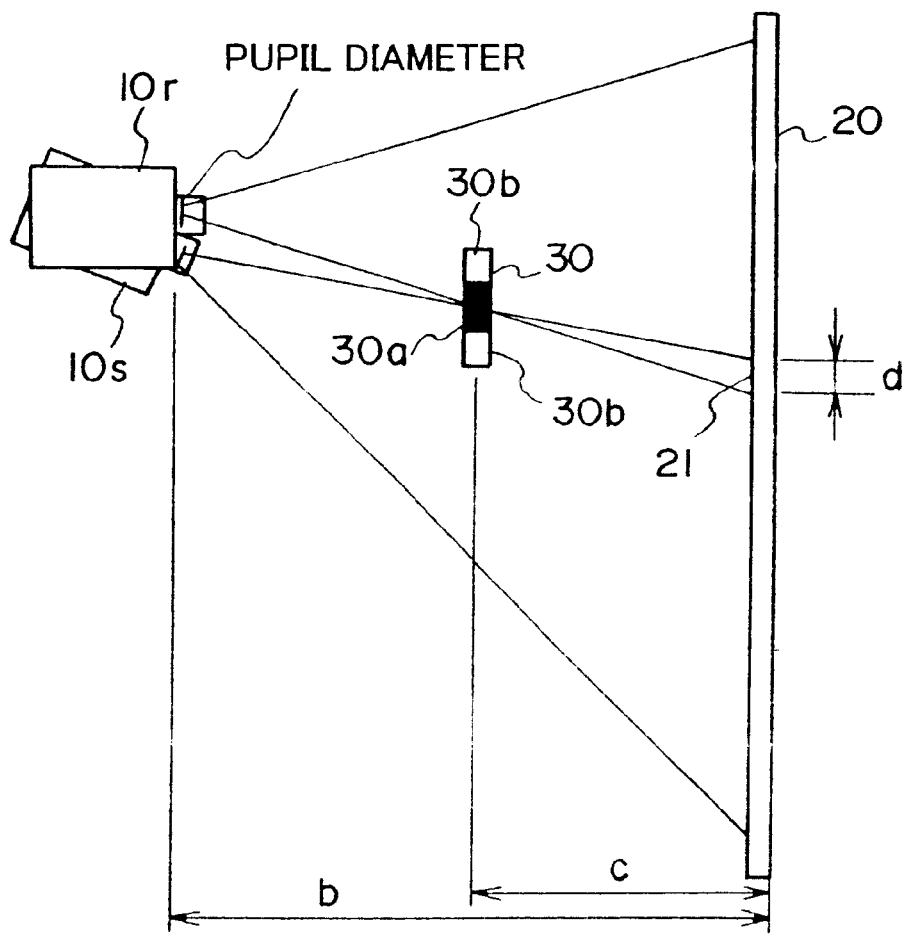
FIG. 8 is a schematic view showing the basic construction of the first embodiment of multiple display apparatus according to the present invention.

As shown in.FIG. 8, in this embodiment the above problem is solved by providing a light dose limiting means for limiting the light dose in the overlap part 21 between a plurality of image projecting means (i.e., although liquid crystal projectors 10r and 10s in FIG. 8 actually m×n image projecting means are provided) and screen 20.

Figure 9:
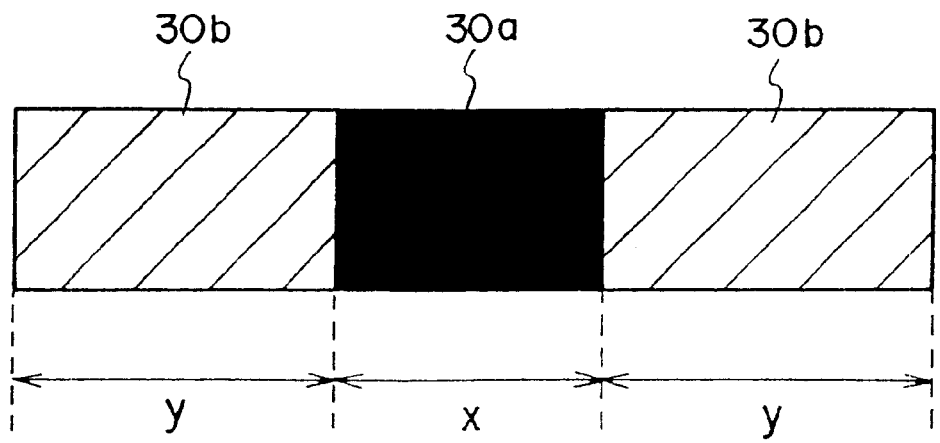
FIG. 9 is a view showing the light dose limiting means in the second embodiment.
Figure 10:
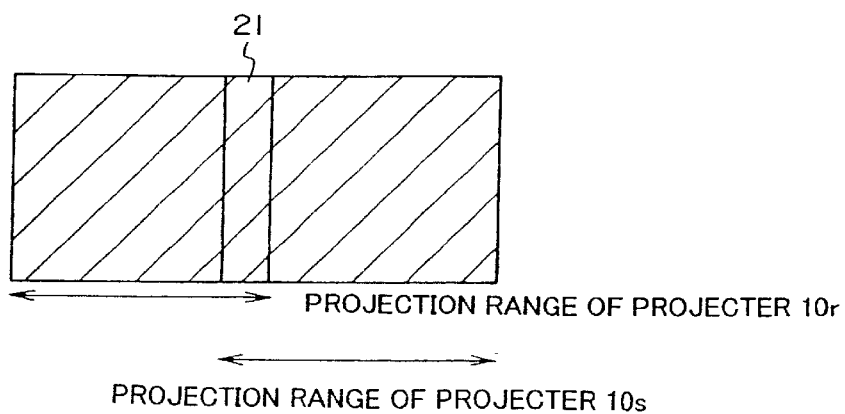
FIG. 10 is a view showing the brightness distribution of the overlap portion in the second embodiment.

As shown in FIG. 9, the light dose limiting means 30 is constituted by a central shielded area 30a and opposite side gradation areas 30b with transmission light dose gradually increasing toward the outer side. The gradation areas are constituted by ND (neutral density) filters. As shown in FIG. 10, with the provision of the such light dose limiting means between the projectors and the screen, it is possible to uniformalize the luminance in the overlap part 21 and the other areas.

Figure 11:
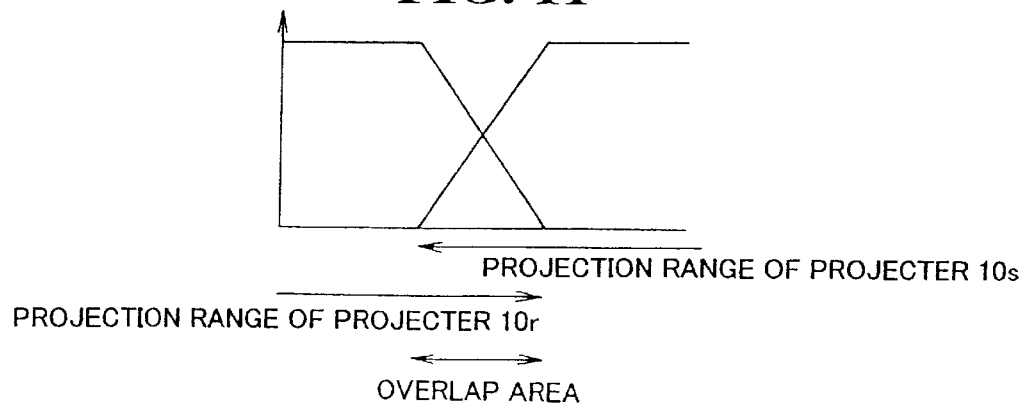
FIG. 11 is a view showing the brightness distribution of the projected light in the second embodiment.

When the luminance distribution of the projected light has a characteristic as shown in FIG. 11, the length x of the shielded area 30a and the length of the gradation areas 30b are given as:

$$x=a \cdot c/b, \text{ and } y=(b-c) \cdot d/b$$

where a is the pupil diameter of the projectors 10r and 10s, b is the distance from the pupil position to the screen, c is the distance from the light dose limiting means 30 to the screen, and d is the horizontal overlap width of the overlap area.

As shown, in this embodiment with the light dose limiting means provided between the projectors and the screen it is possible to uniformalize the brightness in the overlap part and the other areas, so that it is possible to obtain a multiple display apparatus, which can ensure excellent display quality free from pronounced display in the overlap part.

While in the above embodiment the light dose limiting means 30 is provided at the crossing point of the light fluxes from the projectors 10r and 10s, it is also possible to dispose the light dose limiting means on the projector side of the crossing point. In this case, two light dose limiting means are provided for the respective projectors.

The gradation characteristic, which may be straight slope, may also be a curved line from the consideration of the matching with the image correction.

The light dose limiting means may be obtained by means of deposition, printing and painting on a base of glass, acrylic acid, etc. It is also possible to obtain the means by printing on a film of OHP, acetate, etc. or on paper, and applying the printed film or paper sheet on a highly transparent base of glass, acrylic acid, etc.

Figure 12:
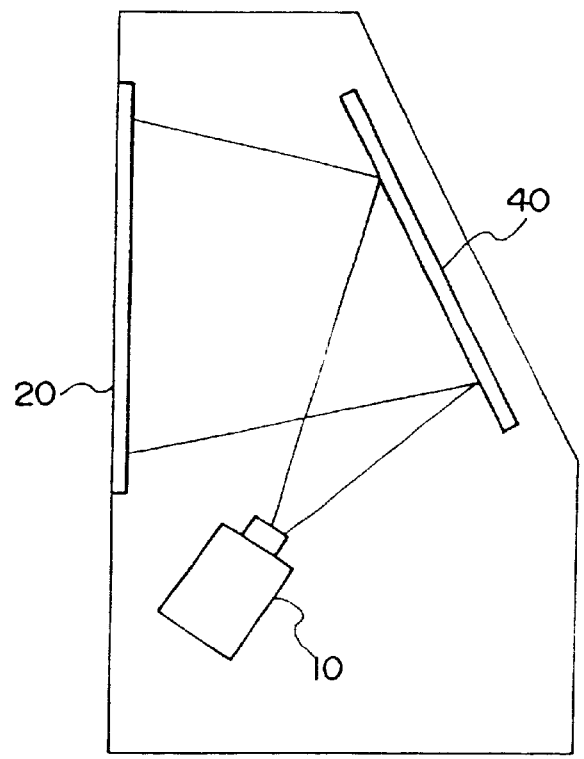
FIG. 12 shows a reflective multiple display apparatus applicable to the second embodiment.

FIG. 12 shows a reflective multiple display apparatus, which is provided for reducing the thickness of the apparatus. In this case, a reflector 40 is disposed between the projector 10 and screen 20. A light dose limiting means having a shielded area and gradation areas may also be provided on the reflector 40. In this case, the distance between the screen 20 and the reflector 40 varies with the position of reflection, and the sizes of the shielded and gradation areas are varied.

The light dose limiting means may be constituted solely by the shielded area and the gradation areas constituted by the ND filters as shown in FIG. 9. In this case, however, if ends of the ND filters are found in the screen, a problem of diffraction or the like may arise. Accordingly, it is possible to form a shielded area and gradation areas by printing or like means on a transparent sheet of such size as to cover the full screen.

As has been described in the foregoing, according to the present invention the overlap part of adjacent images may be made non-pronounced, and it is thus possible to obtain a multiple display apparatus capable of ensuring excellent display quality.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A multiple display apparatus for displaying an image with projection of a plurality of images from a plurality of image projecting means onto a screen, wherein:

the plurality of image projecting means are disposed such that their images are projected substantially from one point onto the screen and the image projecting means include image emitting means for emitting light fluxes of images to be projected onto the screen and reflecting means for reflecting the projection light fluxes emitted from the image emitting means toward the screen, wherein:

those of the plurality of image projecting means for projecting images onto the screen in the same row in horizontal direction are disposed vertically, whereby images of light fluxes emitted from vertically arranged predetermined image emitting means are projected via the reflecting means onto the screen in a predetermined area of the same row in horizontal direction; and those of the plurality of image projecting means for projecting images onto the screen in the same column in images of light fluxes emitted from vertically, whereby predetermined image emitting means are projected via the reflecting means onto the screen in a predetermined area of the same column in vertical direction.

2. A multiple display apparatus for displaying an image with projection of a plurality of images from a plurality of image projecting means onto a screen, wherein:

the plurality of image projecting means are disposed such that their images are projected substantially from one point onto the screen and the image projecting means include image emitting means for emitting light fluxes of images to be projected onto the screen and reflecting means for reflecting the projection light fluxes emitted from the image emitting means toward the screen, wherein an area of the reflecting means of an image projecting means, on which the light flux projected from an adjacent image projecting means onto the screen is partly incident, is constructed such as to transmit part of the incident light.

3. A multiple display apparatus for displaying an image with projection of a plurality of images from a plurality of image projecting means onto a screen, wherein:

the plurality of image projecting means are disposed such that their images are projected substantially from one point onto the screen, the plurality of image projecting means include an image generating means for generating an image to be projected onto the screen, and a lens provided between the image generating means and the screen and those of the plurality of image projecting means, which do not regularly face the screen, are constructed such that the image surfaces of their image generating means are tiltable in vertical direction with respect to the lens axis; and tilting control means for selectively changing the tilting angle of the image surfaces.

4. A multiple display apparatus for displaying an image with projection of a plurality of images from a plurality of image projecting means onto a screen, and the plurality of image projecting means are disposed such that their images are projected substantially from one point onto the screen and adjacent areas of images projected from the plurality of image projecting means onto the screen overlap one another, wherein:

the plurality of image projecting means each include an image generating means for generating an image to be projected onto the screen, and a lens provided between the image generating means and the screen, and those of the plurality of image projecting means, which do not regularly face the screen, are constructed such that the image surfaces of their image generating means are tiltable in vertical direction with respect to the lens axis; and tilting control means for selectively changing the tilting angle of the image surfaces.

5. The multiple display apparatus according to claim 3 or 4, wherein in the focus adjustment of the images projected from the image projecting means onto the screen by adjusting the tilting angles of the image surfaces, no image is projected from the image projecting means adjacent to the image projecting means under adjustment onto the screen.

6. The multiple display apparatus according to claim 3 or 4, which further comprises:

detecting means for detecting a spatial frequency from an image obtained by photographing the image projected onto the screen;

a computing means for obtaining the tilting angle of the image surface of the image generating means on the basis of the detection result by the detecting means; and the tilting control means causes tilting of the image surface of the image generating means on the basis of the tilting angle obtained by the computing means.

7. A multiple display apparatus for displaying an image with projection of a plurality of images from a plurality of image projecting means onto a screen, wherein:

the plurality of image projecting means are disposed such that their images are projected substantially from one point onto the screen and the image projecting means include image emitting means for emitting light fluxes of images to be projected onto the screen and reflecting means for reflecting the projection light fluxes emitted from the image emitting means toward the screen, wherein an area of the reflecting means of an image projecting means, on which the light flux projected from an adjacent image projecting means onto the screen is partly incident, is constructed such as to,transmit part of the incident light.

8. A multiple display apparatus according to claims 1, 2, 3, 4 or 7, wherein:

a light dose limiting means for limiting the light dose in an overlap area of the images projected from the plurality of image projecting means onto the screen, is provided between the image projecting means and the screen.

9. The multiple display apparatus according to claim 8, wherein the light dose limiting means has areas, in which transmitted light dose increases gradually from a point to another.

* * * * *